United States Patent Office 3,146,205
Patented Aug. 25, 1964

3,146,205
LITHIUM-MANGANESE FERROMAGNETIC
FERRITE CORE
Imre J. Hegyi, Cranbury, N.J., assignor to Radio Corporation of America, a corporation of Delaware
No Drawing. Filed Apr. 9, 1962, Ser. No. 185,794
16 Claims. (Cl. 252—62.5)

This invention relates to a lithium-manganese ferromagnetic ferrite core which exhibits a $B_r/B_s$ ratio of at least about 0.90 and a coercive force between about 0.3 and 0.9 oersted. The invention relates also to a method of manufacture thereof. The ferrite core of the invention is particularly adapted to be used as a memory element in coincident current memories of digital electronic computers, and as a saturable reactor in other electronic apparatus. The terms "core" and "body" are used interchangeably in this document to refer to a sintered mass of ferrite particles.

There have been proposed ferrite cores which exhibits a $B_r/B_s$ ratio greater than 0.7 and which consist essentially of a lithium-manganese ferrite. Such lithium-manganese ferrite cores have been prepared by sintering a mixture consisting essentially of lithium oxide, manganese oxide and ferric oxide. The lithium-manganese ferrites generally exhibit a coercive force $H_c$ greater than 1.0 oersted, and usually greater than 5.0 oersteds.

Further improvements to these lithium-manganese ferrite cores are desirable, particularly in providing cores which are particularly adapted to use as memory elements in coincident current memories. Such applications require a combination of desired properties; particularly $B_r/B_s$ ratio of about 0.90 and greater, a coercive force between about 0.3 and 0.8 oersted, and a relatively high Curie temperature. In addition, the cores should be capable of being fabricated by sintering at temperatures of 1250° C. or less in order that the cores be manufactured economically.

An object of this invention is to provide an improved ferromagnetic ferrite body.

Another object is to provide an improved method for fabricating a ferromagnetic ferrite body.

A further object is to provide a lithium-manganese ferrite core which exhibits a $B_r/B_s$ ratio of at least about 0.90 and a coercive force between about 0.3 and 0.8 oersted.

In general, the objects of this invention are achieved with a ferrite core which comprises a ceramic prepared by sintering a mixture consisting essentially of:

| Ingredient | Mol percent |
|---|---|
| Lithium fluoride | 1 to 5 |
| Manganese oxide | 50 to 59 |
| Ferric oxide | 40 to 49 | at temperatures between about 1150 and 1250° C. If the sintering is carried out in an air atmosphere, either the core should be air quenched, or the core should be annealed in an atmosphere of a neutral gas, such as nitrogen, containing 0.5 to 2.0 volume percent oxygen. The sintering may be also carried out in an atmosphere of nitrogen containing 0.5 to 2.0 volume percent oxygen and then slowly cooled in this atmosphere. By substituting lithium fluoride for the lithium oxide used in the prior art method, and sintering the mixture as described, cores are produced which achieve the objects of the invention.

*Example.*—A ferromagnetic core of the invention may be prepared by the following procedure. Mix a raw batch of the following ingredients.

| Ingredient: | Molar percent |
|---|---|
| LiF Mallinkrodt CP powder | 3.5 |
| MnO, as $MnCO_3$ Baker's analyzed reagent grade | 51.5 |
| $Fe_2O_3$, as Fisher's analyzed reagent grade, $Fe_2O_3$ | 45 |

The raw batch is attrited in methanol in a steel ball mill for about four hours and then dried at about 100° C. and screened. The attrited mixture is calcined for about one half hour in air at about 800° C. The calcined batch is attrited in methanol for about twenty hours and then dried. About 3.5 weight percent of a suitable organic binder is evenly dispersed through the dry calcined batch. One suitable binder is Flexalyn in methyl ethyl ketone, which binder is marketed by the Hercules Powder Company, Wilmington, Delaware. The calcined batch with the binder added is screened through an 80 mesh screen. The screened calcined batch is then pressed into toroidal cores, about 0.20″ O.D. x 0.15″ I.D. x 0.05 thick. The pressed cores are then sintered for about 2 hours at about 1150° C. in air and then air quenched by removing the cores from the furnace directly into room temperature.

A core prepared according to the example exhibits a $B_r/B_s$ ratio of about 1.00, a coercive force $H_c$ of about 0.35, and a Curie temperature of about 340° C. The data for the core of the example appears in the table along with the data for other cores prepared according to the invention.

The following compositional and procedural variations may be made from that set forth in the example. The composition of the raw batch may be varied as described above. In addition, up to about 10 mol percent of ZnO and/or CdO may be substituted for MnO in the raw batch. Such substitutions lower the coercive force $H_c$ and lower the Curie temperature of the final product.

The composition of the final product is uncertain. Chemical analysis of the final product indicates that almost all of the fluorine content of the batch is lost during the sintering step. Also, a portion of the manganese in the raw batch is lost during the sintering step. These losses seem to indicate that there is a chemical reaction in which manganese fluoride is formed and volatilized during the sintering step. This is reasonable since manganese fluoride has a relatively low volatilization temperature compared with the other possible compounds which may be present during sintering.

Except for lithium fluoride, the batch may be compounded of the constituent metal oxides or of compounds which yield the constituent metal oxides by chemical reaction during the calcining of the raw batch or during the sintering of the core. Typical compounds may be, for example, carbonates, oxides, or acetates of manganese and iron. A high degree of purity is desirable, preferably the "chemically pure" grade of chemicals.

In the example, the steps of mixing, calcining, attriting, drying, and screening are designed to provide an intimate mixture of the ingredients, and to remove gases, water, and volatile organic matter contained in the raw batch. These steps are not critical. Any procedure which provides a dry, intimate mixture of the ingredients is satisfactory.

In the example, the calcining step is important. The calcining temperature may be between 700° and 900° C., but is preferably near the middle of the range. The calcining time is not critical, although shorter times are preferred with higher calcining temperatures. Air is the preferred calcining atmosphere. Other atmospheres having oxidizing characteristics similar to that of air at the calcining temperature may also be used.

In the example, attriting the calcined batch, addition of a binder, screening, and pressing are not critical to the magnetic properties of the final product; however, a proper selection should be made in order to obtain the desired shape and size of product with a minimum distortion. Besides toroidal cores, other shapes such as magnetic memory plates and transfluxor cores may be prepared. See a description of ferrite core fabrication processes in G. S. Hipskind et al., "Processing and Testing Rectangular Loop Cores," RCA Engineer, volume II, No. 6, 1957, pages 9 to 13.

In the example, the sintering temperature may be between about 1150° and 1250° C. The sintering time is not critical. Any sintering time sufficient for complete sintering of the core is adequate. One to 24 hours, preferably 2 hours, have been found to be convenient firing times.

The sintering atmosphere and the cooling or annealing atmosphere are important. The cores described herein may be prepared by sintering in air and then air quenching the cores as described in the example. By one procedure for carrying out this alternative the cores, which are on a hot setter plate, are removed from the furnace at about the sintering temperature directly into a room temperature ambient. The cores are dumped from the hot setter plate to a setter plate at room temperature and permitted to cool. Generally, the cores are on a setter plate when they are sintered, and any method of rapid cooling in air to room temperature may be used for quenching.

Alternatively, the cores may be sintered in an air atmosphere as described above and then annealed in an atmosphere consisting essentially of a neutral gas containing 0.5 to 2.0 volume percent oxygen gas. Some suitable neutral gases are nitrogen, argon, neon, helium, or mixtures thereof. The annealing temperature may be about 900 to 1100° C. The annealing time is not critical. One to 10 hours, preferably 2 hours, is a convenient time period for annealing. This alternative may be carried out in one or two steps.

Alternatively, the cores may be sintered in an atmosphere consisting essentially of a neutral gas containing 0.5 to 2.0 volume percent oxygen gas and then slowly cooled to room temperature (annealed) in the same atmosphere.

The table tabulates some of the properties of some typical cores of the invention. The table indicates the composition and method of preparation and gives the coercive force $H_c$ in oersteds and $B_r/B_s$ ratio to the second decimal place. The values of $H_c$ and $B_r/B_s$ ratio were obtained from 60 c.p.s. loop traces on toroids which were wound with a primary of 6 turns and a secondary of 4 turns of copper wire. A 60 c.p.s. sine wave drive current was applied to the primary. The secondary was connected to the input of an amplifier. The output of the amplifier was connected to an integrating circuit. The output of the integrating circuit was applied to the vertical plates of an oscilloscope. The horizontal trace of the oscilloscope was proportional to the drive current applied to the primary on the sample. The drive current was between about 0.2 and 2.0 amperes. Curie temperature measurements indicate that all of the cores of the invention have a Curie temperature greater than 300° C.

*Table*

| Mol percent | | | 1,150° C., 2 hrs., air quenched | | 1,200° C., 1 hr., air quenched | | 1,250° C., 1 hr., air quenched | | 1,150° C., 2 hrs., 0.4% $O_2$ 99.6% | |
|---|---|---|---|---|---|---|---|---|---|---|
| LiF | MnO | $Fe_2O_3$ | $B_r/B_s$ | $H_c$ | $B_r/B_s$ | $H_c$ | $B_r/B_s$ | $H_c$ | $B_r/B_s$ | $H_c$ |
| 1 | 54 | 45 | | | 0.98 | 0.34 | | | | |
| 2.5 | 52.5 | 45 | 0.97 | 0.50 | 0.95 | 0.50 | 0.98 | 0.43 | 0.98 | 0.59 |
| 3.5 | 51.5 | 45 | 1.00 | 0.35 | 0.98 | 0.34 | 0.98 | 0.52 | 1.00 | 0.43 |
| 5 | 50 | 45 | | | 0.91 | 0.67 | 0.94 | 0.68 | 1.00 | 0.76 |
| 2.5 | 57.5 | 40 | 0.92 | 0.54 | 1.00 | 0.38 | 0.94 | 0.40 | | |
| 3.5 | 56.5 | 40 | | | 1.00 | 0.49 | | | | |
| 5 | 55 | 40 | | | | | | | 0.93 | 0.66 |

What is claimed is:

1. A ferromagnetic ferrite having a $B_r/B_s$ ratio of at least 0.90 formed by calcining a mixture consisting essentially of:

Mol percent

Lithium fluoride _____ 1 to 5
Manganese oxide _____ 50 to 59
Ferric oxide _____ 40 to 49 at about 700 to 900° C. in an oxidizing atmosphere, shaping a core from said calcined mixture, and sintering said core for 1 to 24 hours at about 1150 to 1250° C.

2. A ferromagnetic ferrite having a $B_r/B_s$ ratio of at least about 0.90 and a coercive force of about 0.3 to 0.8 oersted formed by calcining a mixture consisting essentially of:

Mol percent

Lithium fluoride _____ 1 to 5
Manganese oxide _____ 50 to 59
Ferric oxide _____ 40 to 49 at about 700 to 900° C. in an oxidizing atmosphere, shaping a core from said calcined mixture, sintering said core for 1 to 24 hours in air at about 1150 to 1250° C., and then air quenching said sintered core.

3. A ferromagnetic ferrite having a $B_r/B_s$ ratio of at least about 0.90 and a coercive force of about 0.3 to 0.8 oersted formed by calcining a mixture consisting essentially of:

Mol percent

Lithium fluoride _____ 1 to 5
Manganese oxide _____ 50 to 59
Ferric oxide _____ 40 to 49 at about 700 to 900° C. in an oxidizing atmosphere, shaping a core from said calcined mixture, sintering said core for 1 to 24 hours in air at about 1150 to 1250° C., and then annealing said sintered core for 1 to 10 hours at about 900 to 1100° C. in an atmosphere consisting essentially of a neutral gas containing about 0.5 to 2.0 volume percent oxygen.

4. A ferromagnetic ferrite having a $B_r/B_s$ ratio of at least about 0.90 and a coercive force of about 0.3 to 0.8 oersted formed by calcining a mixture consisting essentially of:

Mol percent

Lithium fluoride _____ 1 to 5
Manganese oxide _____ 50 to 59
Ferric oxide _____ 40 to 49 at about 700 to 900° C. in an oxidizing atmosphere, shaping a core from said calcined mixture, sintering said core for 1 to 24 hours at about 1150 to 1250° C. in an atmosphere consisting essentially of a neutral gas containing 0.5 to 2.0 volume percent oxygen, and then annealing said sintered core for 1 to 10 hours at about 900 to 1100° C. in said atmosphere.

5. A ferromagnetic ferrite having a $B_r/B_s$ ratio of at least about 0.90 and a coercive force of about 0.3 to 0.8 oersted formed by calcining a mixture consisting essentially of:

| | Mol percent |
|---|---|
| Lithium fluoride | 2.5 to 3.5 |
| Manganous oxide | 51.5 to 57.5 |
| Ferric oxide | 40 to 45 | at about 700 to 900° C. in an oxidizing atmosphere, shaping a core from said calcined mixture, and sintering said core for 1 to 24 hours at about 1150 to 1250° C.

6. A ferromagnetic ferrite having a $B_r/B_s$ ratio of at least about 0.90 and a coercive force of about 0.3 to 0.8 oersted formed by calcining a mixture consisting essentially of:

| | Mol percent |
|---|---|
| Lithium fluoride | 2.5 |
| Manganous oxide | 52.5 |
| Ferric oxide | 45.0 | at about 700 to 900° C. in an oxidizing atmosphere, shaping a core from said calcined mixture, sintering said core for 1 to 24 hours at about 1150 to 1250° C. in air, and then air quenching said sintered core.

7. A ferromagnetic ferrite having a $B_r/B_s$ ratio of at least about 0.90 and a coercive force of about 0.3 to 0.8 oersted formed by calcining a mixture consisting essentially of:

| | Mol percent |
|---|---|
| Lithium fluoride | 3.5 |
| Manganous oxide | 51.5 |
| Ferric oxide | 45.0 | at about 700 to 900° C. in an oxidizing atmosphere, shaping a core from said calcined mixture, sintering said core for 1 to 24 hours in air at about 1150 to 1250° C., and then air quenching said sintered core.

8. A ferromagnetic ferrite having a $B_r/B_s$ ratio of at least about 0.90 and a coercive force of about 0.3 to 0.8 oersted formed by calcining a mixture consisting essentially of:

| | Mol percent |
|---|---|
| Lithium fluoride | 2.5 |
| Manganous oxide | 52.5 |
| Ferric oxide | 45.0 | at about 700 to 900° C. in an oxidizing atmosphere, shaping a core from said calcined mixture, sintering said core for 1 to 24 hours in air at about 1150 to 1250° C., and then annealing said sintered core for 1 to 10 hours at about 900 to 1100° C. in an atmosphere consisting essentially of nitrogen containing about 0.5 to 2.0 volume percent oxygen.

9. A ferromagnetic ferrite having a $B_r/B_s$ ratio of at least about 0.90 and a coercive force of about 0.3 to 0.8 oersted formed by calcining a mixture consisting essentially of:

| | Mol percent |
|---|---|
| Lithium fluoride | 3.5 |
| Manganous oxide | 51.5 |
| Ferric oxide | 45.0 | at about 700 to 900° C. in an oxidizing atmosphere, shaping a core from said calcined mixture, sintering said core for 1 to 24 hours in air at about 1150 to 1250° C., and then annealing said sintered core for 1 to 10 hours at about 900 to 1100° C. in an atmosphere consisting essentially of nitrogen containing about 0.5 to 2.0 volume percent oxygen.

10. A method for preparing a ferromagnetic ferrite having a $B_r/B_s$ ratio of at least about 0.90 comprising calcining a mixture consisting essentially of:

| | Mol percent |
|---|---|
| Lithium fluoride | 1 to 5 |
| Manganese oxide | 50 to 59 |
| Ferric oxide | 40 to 49 | at about 700 to 900° C. in air, shaping a core from said calcined mixture, and then sintering said core at about 1150 to 1250° C.

11. A method for preparing a ferromagnetic ferrite having a $B_r/B_s$ ratio of at least about 0.90 and a coercive force of about 0.3 to 0.8 oersted comprising calcining a mixture consisting essentially of:

| | Mol percent |
|---|---|
| Lithium fluoride | 1 to 5 |
| Manganese oxide | 50 to 59 |
| Ferric oxide | 40 to 49 | at about 700 to 900° C. in air, shaping a core from said calcined mixture, sintering said core for 1 to 24 hours in air at about 1150 to 1250° C., and then air quenching said sintered core.

12. A method for preparing a ferromagnetic ferrite having a $B_r/B_s$ ratio of at least about 0.90 and a coercive force of about 0.3 to 0.8 oersted comprising calcining a mixture consisting essentially of:

| | Mol percent |
|---|---|
| Lithium fluoride | 1 to 5 |
| Manganese oxide | 50 to 59 |
| Ferric oxide | 40 to 49 | at about 700 to 900° C. in air, shaping a core from said calcined mixture, sintering said core for 1 to 24 hours in air at about 1150 to 1250° C., and then annealing said core for 1 to 10 hours at about 900 to 1100° C. in an atmosphere consisting essentially of a neutral gas containing 0.5 to 2.0 volume percent oxygen.

13. A method for preparing a ferromagnetic ferrite having a $B_r/B_s$ ratio of at least about 0.90 and a coercive force of about 0.3 to 0.8 oersted comprising calcining a mixture consisting essentially of:

| | Mol percent |
|---|---|
| Lithium fluoride | 1 to 5 |
| Manganese oxide | 50 to 59 |
| Ferric oxide | 40 to 49 | at about 700 to 900° C. in air, shaping a core from said calcined mixture, sintering said core for 1 to 24 hours at about 1150 to 1250° C. in an atmosphere consisting essentially of a neutral gas containing 0.5 to 2.0 volume percent oxygen, and then annealing said core for 1 to 10 hours at about 900 to 1100° C. in said atmosphere.

14. A method for preparing a ferromagnetic ferrite having a $B_r/B_s$ ratio of at least about 0.90 and a coercive force of about 0.3 to 0.8 oersted comprising calcining a mixture consisting essentially of:

| | Mol percent |
|---|---|
| Lithium fluoride | 2.5 to 3.5 |
| Manganese oxide | 51.5 to 57.5 |
| Ferric oxide | 40 to 45 | at about 700 to 900° C. in air, shaping a core from said calcined mixture, sintering said core for 1 to 24 hours in air at about 1150 to 1250° C., and then air quenching said sintered core.

15. A method for preparing a ferromagnetic ferrite having a $B_r/B_s$ ratio of at least about 0.90 and a coercive force of about 0.3 to 0.8 oersted comprising calcining a mixture consisting essentially of:

| | Mol percent |
|---|---|
| Lithium fluoride | 2.5 to 3.5 |
| Manganese oxide | 51.5 to 57.5 |
| Ferric oxide | 40 to 45 | at about 700 to 900° C. in air, shaping a core from said calcined mixture, sintering said core for 1 to 24 hours in air at about 1150 to 1250° C., and then annealing said core for 1 to 10 hours at about 900 to 1100° C. in an atmosphere consisting essentially of nitrogen containing 0.5 to 2.0 volume percent oxygen.

16. A method for preparing a ferromagnetic ferrite having a $B_r/B_s$ ratio of at least about 0.90 and a coercive force of about 0.3 to 0.8 oersted comprising calcining a mixture consisting essentially of:

| | Mol percent |
|---|---|
| Lithium fluoride | 2.5 to 3.5 |
| Manganous oxide | 51.5 to 57.5 |
| Ferric oxide | 40 to 45 | at about 700 to 900° C. in air, shaping a core from said calcined mixture, sintering said core for 1 to 24 hours at about 1150 to 1250° C. in an atmosphere consisting essentially of nitrogen containing 0.5 to 2.0 volume percent oxygen, and then annealing said core for 1 to 10 hours at about 900 to 1100° C. in said atmosphere.

References Cited in the file of this patent

UNITED STATES PATENTS

| 2,962,345 | Brixner | Nov. 29, 1960 |
| 3,065,182 | Aghajanian | Nov. 20, 1962 |